(12) United States Patent
Swanson et al.

(10) Patent No.: US 10,963,029 B1
(45) Date of Patent: Mar. 30, 2021

(54) POWER VIRUS GENERATION

(71) Applicant: Amazon Technologies, Inc., Seattle, WA (US)

(72) Inventors: Todd Swanson, Pflugerville, TX (US); Nishith Desai, Austin, TX (US); Thomas A. Volpe, Austin, TX (US); Ron Diamant, Santa Clara, CA (US)

(73) Assignee: Amazon Technologies, Inc., Seattle, WA (US)

(*) Notice: Subject to any disclaimer, the term of this patent is extended or adjusted under 35 U.S.C. 154(b) by 98 days.

(21) Appl. No.: 16/453,824

(22) Filed: Jun. 26, 2019

(51) Int. Cl.
*G06F 1/28* (2006.01)
*G06F 1/3206* (2019.01)
*G06K 9/62* (2006.01)
*G06F 1/30* (2006.01)

(52) U.S. Cl.
CPC .............. *G06F 1/28* (2013.01); *G06F 1/30* (2013.01); *G06F 1/3206* (2013.01); *G06K 9/6227* (2013.01)

(58) Field of Classification Search
CPC ............ G06F 1/30; G06F 1/3206; G06F 1/28; G06K 9/6227
See application file for complete search history.

(56) References Cited

U.S. PATENT DOCUMENTS

| | | | |
|---|---|---|---|
| 9,122,632 B2* | 9/2015 | Hurd | G06F 12/0811 |
| 2012/0253712 A1* | 10/2012 | Sugiyama | G06F 30/33 702/61 |
| 2015/0058845 A1* | 2/2015 | Song | G06F 9/5077 718/1 |
| 2017/0185132 A1* | 6/2017 | Bodas | G06F 11/3433 |
| 2018/0101216 A1* | 4/2018 | Mahindru | G06F 1/3228 |
| 2018/0101220 A1* | 4/2018 | Mahindru | G06F 1/3296 |

* cited by examiner

*Primary Examiner* — Raymond N Phan
(74) *Attorney, Agent, or Firm* — Kilpatrick Townsend & Stockton LLP

(57) ABSTRACT

Systems and methods for power analysis of a hardware device design. In various examples, a target circuit can be defined within the hardware device design. The target circuit can include a plurality of digital circuit elements linking a plurality of input nodes with a plurality of output nodes. A solver can be used to search for a transition pattern that, when applied to the input nodes, causes a number of output nodes equal to a counter to transition from a first binary value to a second binary value. If a transition pattern cannot be found, the counter is decremented and a new transition pattern is searched for. Once a transition pattern is found, it is determined whether the transition pattern satisfies a constraint.

20 Claims, 13 Drawing Sheets

1100

Defining a target circuit within the hardware device design, the target circuit including a plurality of digital circuit elements linking a plurality of input nodes with a plurality of output nodes
1102

Generating a first input pattern that, when applied to the plurality of input nodes, causes the plurality of output nodes to switch to a first set of output values having a maximum number of values equal to a particular binary value
1104

Generating a second input pattern that, when applied to the plurality of input nodes, causes the plurality of output nodes to switch to a second set of output values having a minimum number of values equal to the particular binary value
1106

Generating a transition pattern that either: when applied to the plurality of input nodes after the first input pattern, causes the plurality of output nodes to switch to the second set of output values, or when applied to the plurality of input nodes after the second input pattern, causes the plurality of output nodes to switch to the first set of output values
1108

Determining whether the transition pattern satisfies a constraint
1110

Calculating a power dissipation associated with the transition pattern
1112

```
┌─────────────────────────────────────────────────────────────────┐
│ Defining a target circuit within the hardware device design,    │
│ the target circuit including a plurality of digital circuit     │
│ elements linking a plurality of input nodes with a plurality    │
│ of output nodes                                                 │
│ 1202                                                            │
└─────────────────────────────────────────────────────────────────┘
                              ↓
┌─────────────────────────────────────────────────────────────────┐
│ Setting a counter equal to a start value                        │
│ 1204                                                            │
└─────────────────────────────────────────────────────────────────┘
                              ↓
┌─────────────────────────────────────────────────────────────────┐
│ Determining, using a solver, whether a first transition pattern │
│ exists that, when applied to the plurality of input nodes,      │
│ causes a first number of output nodes equal to the counter to   │
│ transition from a first binary value to a second binary value   │
│ 1206                                                            │
└─────────────────────────────────────────────────────────────────┘
                              ↓
┌─────────────────────────────────────────────────────────────────┐
│ In response to determining that the first transition pattern    │
│ does not exist, decrementing the counter by a decrement amount  │
│ 1208                                                            │
└─────────────────────────────────────────────────────────────────┘
                              ↓
┌─────────────────────────────────────────────────────────────────┐
│ Determining, using a solver, whether a second transition        │
│ pattern exists that, when applied to the plurality of input     │
│ nodes, causes a second number of output nodes equal to the      │
│ decremented counter to transition from the first binary value   │
│ to the second binary value                                      │
│ 1210                                                            │
└─────────────────────────────────────────────────────────────────┘
                              ↓
┌─────────────────────────────────────────────────────────────────┐
│ In response to determining that the second pattern exists,      │
│ generating, using the solver, the second transition pattern     │
│ 1212                                                            │
└─────────────────────────────────────────────────────────────────┘
                              ↓
┌─────────────────────────────────────────────────────────────────┐
│ Determining whether the second transition pattern satisfies     │
│ a constraint                                                    │
│ 1214                                                            │
└─────────────────────────────────────────────────────────────────┘
                              ↓
┌─────────────────────────────────────────────────────────────────┐
│ Calculating a power dissipation associated with the second      │
│ transition pattern                                              │
│ 1216                                                            │
└─────────────────────────────────────────────────────────────────┘
```

FIG. 12

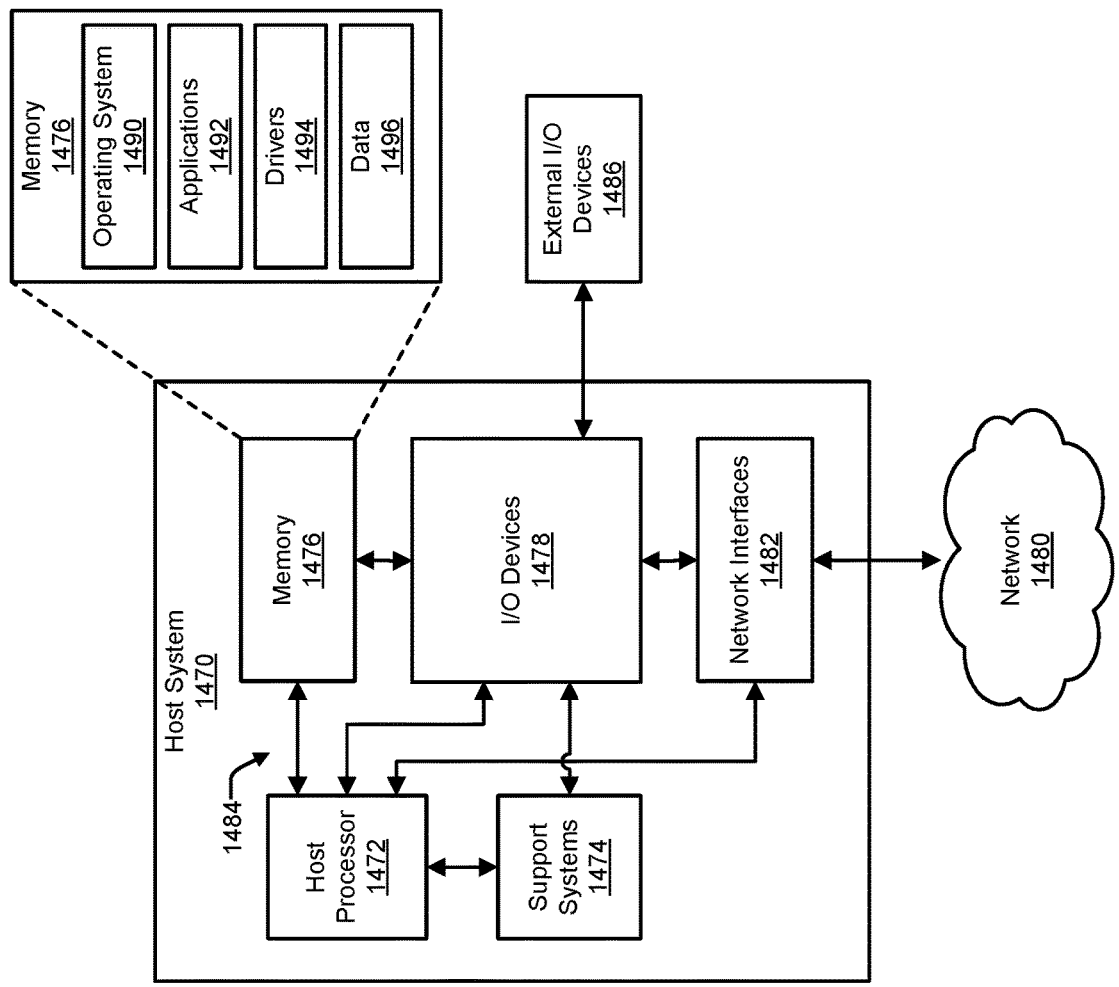

POWER VIRUS GENERATION

BACKGROUND

Power analysis is a process by which the power consumption of a hardware device is determined. Power analysis can be conducted during the design process of a hardware device, so that the expected power consumption of the device can be estimated, and changes to the design can be made if the estimated power consumption is too great. The power consumption of the device can be estimated using, for example, theoretical charge and discharge values for the logic cells of the design, and toggle rates of signals that drive the logic cells. The theoretical power consumption may be based on physical characteristics of the logic cells and/or empirical testing, and may be derived from the design libraries provided by a semiconductor fabricator.

In various examples, power analysis can be conducted by exercising the hardware device design. For example, a simulation-based power analysis tool can execute a software simulation that includes code representing the hardware device. In this example, the tool can drive inputs into the simulated device, and can process the outputs of the device. As another example, an emulation-based power analysis tool can use the code that represents the hardware device to configure a hardware system (often referred to as an emulator) to reproduce the design. In this example, the emulation system can drive inputs into the emulated device, and process the outputs. In each of these examples, the tool can further capture the toggle rates of signals in the device, and record the cells that are affected by toggling of the signals. A total power consumption, as well as steady-state power consumption and/or peak and trough power consumption can be calculated.

BRIEF DESCRIPTION OF THE DRAWINGS

Various examples in accordance with the present disclosure will be described with reference to the drawings, in which:

FIG. 11 illustrates an example method for power analysis of a hardware device design.

FIG. 12 illustrates an example method for power analysis of a hardware device design.

FIG. 14 includes a block diagram that illustrates an example of a host system in which an integrated circuit device can be used.

DETAILED DESCRIPTION

Figure 1:
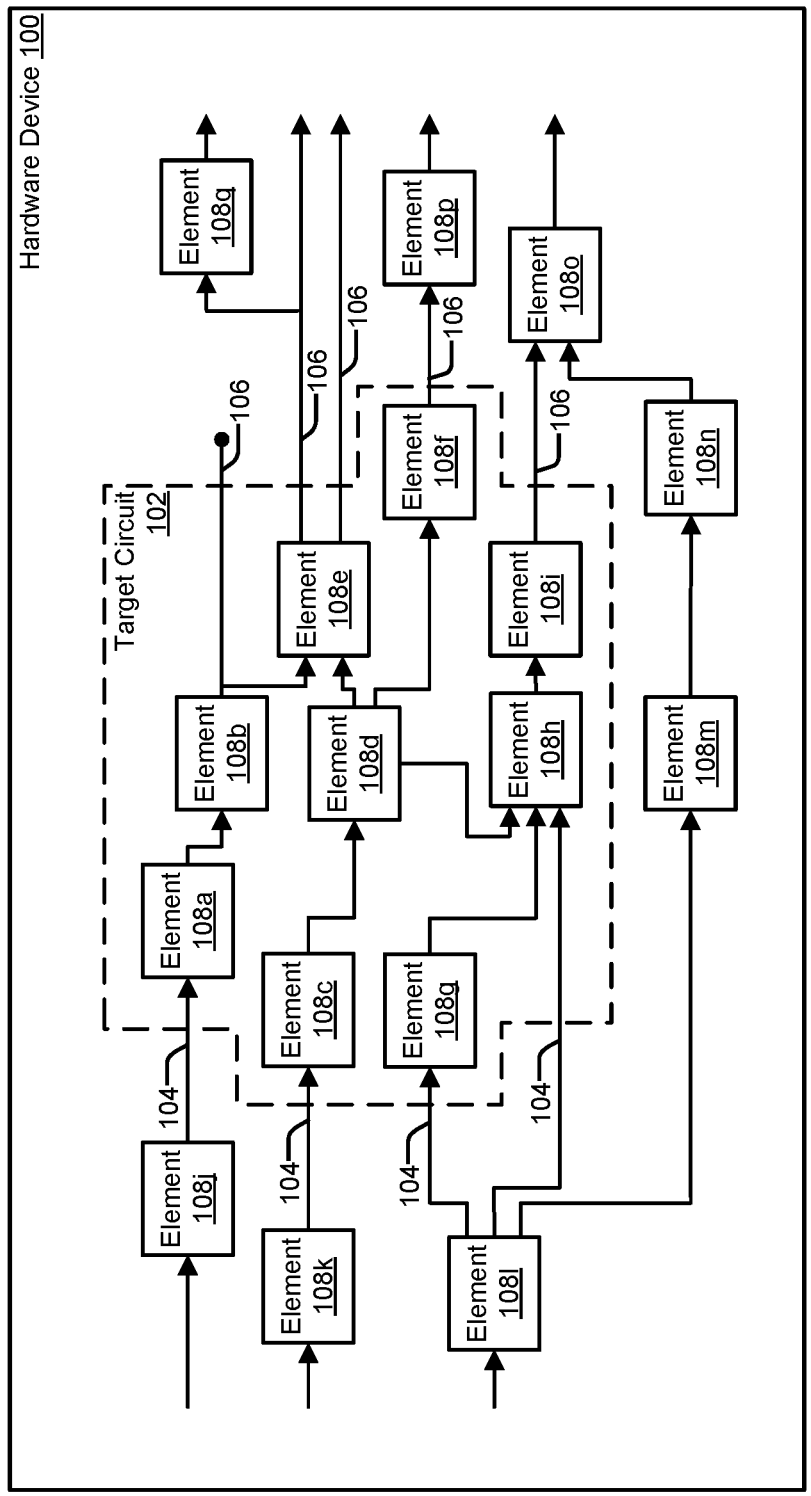
FIG. 1 illustrates an example hardware device having multiple digital circuit elements.

High-performance integrated circuit devices can consume a large amount of power. Reducing the power consumption of a device may be necessary for various reasons. For example, high power consumption in an integrated circuit device can lead to early failure of the device, due to overheating and other issues. Extensive cooling can be added to a system in which the device operates to avoid overheating of the device or of other components in the system, but the cooling system may increase the cost of the system beyond a commercially reasonable amount and/or increase the physical size of the system. As another example, a system in which the integrated circuit device is to operate must be able to supply adequate power to the device. This may limit which systems can be used with the device.

Energy efficient design can reduce power that an integrated circuit device will consume once the device is manufactured. Energy efficient design can include making changes to the functions performed by the device and/or the manner in which the device performs the functions, with these changes being made during the design of the device. To understand the changes that may need to be made, the design development of the device can include determining estimates of the device's power consumption at various stages of the development. Power analysis can begin as early as during the microarchitecture development and can continue until as late as the physical design stage. Accurate, effective, and flexible power estimation tools and workflows may thus be needed, which can produce power consumption projections at the various stages of the design life cycle.

Power analysis can have difficulties that can affect the accuracy of the results and/or the efficiency with which useful results can be produced. For example, power consumption can relate directly to the performance of the integrated circuit device. Thus, to obtain accurate power consumption estimations, it may be desirable to extract power estimation results while the device is under what is expected to be normal operation. For example, the device can be made to execute software that the device will run when in use. Simulating a pre-silicon device design, however, can be very time consuming, potentially requiring hours of simulation time to exercise each of the functions of the device. Tools, such as emulators, may be faster than a software simulation, but may provide less visibility into the inner workings of the device during the device's operation.

In many cases, power analysis aims to estimate the peak power dissipation of the integrated circuit device at any moment in time, as it can be one of the biggest indicators for analyzing chip reliability at extreme conditions. The power virus problem involves finding input vectors that cause peak power dissipation in a circuit. A power virus pattern is different from a worst case average power pattern in that it may not occur 99% of the time the chip is operating, but the 1% probability of it occurring can be catastrophic. The large inrush current demands during this time can sometimes be too large and create local thermal hotspots affecting the chip reliability and performance. Furthermore, it can cause unrecoverable thermal runaway problems sometimes resulting in the chip being physically damaged.

It can be difficult to obtain a power virus pattern that truly exercises the input patterns to be able to cause the chip to have close to zero activity in one cycle and maximum activity (switching nodes) in the next. Some approaches to obtain the power virus pattern include manual review from an expert designer as well as gate-level simulations and counting of gate outputs that toggle. As the power virus problem is NP-complete (nondeterministic polynomial time complete), these techniques are less scalable with increasing design-size, and thus produce less optimal vectors and additionally consume significant engineering time and effort.

Provided herein are alternative approaches for obtaining a power virus pattern that can be performed by a computing device based on a target circuit having multiple digital circuit elements. The target circuit can have multiple input nodes and multiple output nodes, and can be defined in a way that various levels of granularity of the underlying hardware features can be achieved. For example, the target circuit can be defined so as to obscure many gate inputs and outputs or, alternatively, can include each possible gate input and output. Because the peak power dissipation is closely related to the maximum number of gates outputs that toggle in a single cycle or over a short window, different input patterns are generated that, when applied to the input nodes, have significantly different effects on the output nodes. Next, transition patterns that link the output values of one of the input patterns to the output values of another input pattern are generated.

In some examples, a first input pattern may be generated that causes the output nodes to have a maximum number of output nodes switch to a particular binary value. The maximum number of output nodes that can be switched to the particular binary value at the same time may be less than the total number of output nodes depending on the logic function of the target circuit. The binary value may be 0 or 1, which may correspond to a signal level below or above a threshold, respectively. In some cases, there may be multiple first input patterns that cause the output nodes to have the maximum number of nodes switch to the particular binary value, but not necessarily in the same order. For example, different input patterns may cause a particular set of output nodes to switch to [01111111], [10111111], [11111011], and [10111111].

In some examples, a second input may be generated that causes the output nodes to have a minimum number of output nodes switch to the particular binary value. The minimum number of output nodes that can be switched to the particular binary value at the same time may be greater than zero depending on the logic function of the target circuit. In some cases, there may be multiple second input patterns that cause the output nodes to have the minimum number of output nodes switch to the particular binary value, but not necessarily in the same order. For example, different input patterns may cause the output nodes to switch to [00011000], [00100100], and [01000100].

In some examples, a transition pattern is generated that, when applied to the input nodes, causes the output nodes to switch from the first set of output values to the second set of output values, or vice versa. In some examples, multiple transition patterns can be obtained between a single first set of output values associated with a single first input pattern and a single second set of output values associated with a single second input pattern. If multiple first and second input patterns are generated, additional transition patterns can be generated for each pairwise combination.

The generated transition patterns may be tested to determine whether they qualify as valid power virus patterns. In some cases, a valid power virus pattern exists where a transition pattern satisfies a constraint such as having a length or duration less than a timing constraint. The timing constraint may be a number of cycles, a time window, among other possibilities. For example, only transition patterns that can be performed within a certain number of clock cycles or transition cycles may qualify as valid power virus patterns. Such transition patterns may be outputted, flagged, and/or be subject to further power analysis. In some instances, a power dissipation associated with the transition patterns that qualify as valid power virus patterns may be calculated. In some examples, the transition pattern and its associated input pattern may collectively be referred to as the power virus pattern.

In some examples, a maximum number of transitions at the output nodes is found using an iterative approach. In some examples, a counter is first set equal to the number of output nodes. Next, a solver is used to determine whether a transition pattern exists that, when applied to the input nodes, causes a number of output nodes equal to the counter to transition from a first binary value (e.g., 1) to a second binary value (e.g., 0). If it is determined that such a transition pattern does not exist, the counter is decremented by one and the solver is again used to determine whether a transition pattern exists that causes a number of output nodes equal to the decremented counter to transition from the first binary value to the second binary value. This is repeated until a transition pattern is found to exist. It is then determined whether the transition pattern satisfies a constraint.

In the following description, various examples will be described. For purposes of explanation, specific configurations and details are set forth in order to provide a thorough understanding of these examples. However, it will also be apparent to one skilled in the art that the examples may be practiced without the specific details. Furthermore, well-known features may be omitted or simplified in order not to obscure the examples being described.

FIG. 1 illustrates an example hardware device 100 having multiple digital circuit elements 108, each performing various functions. In various examples, digital circuit elements 108 can be sequential logic elements and/or combinational logic elements. In some examples, the hardware device 100 is an integrated circuit device. For example, the hardware device 100 may include an arithmetic logic unit (ALU), in which case the digital circuit elements 108 can perform addition, subtraction, an AND operation, an OR operation, among other possibilities. As another example, the hardware device 100 can include a memory and/or a memory controller, in which case the digital circuit elements 108 can perform a memory read or a memory write. The hardware device 100 can alternatively be referred to as a hardware device design.

In some examples, a target circuit 102 can be defined within the hardware device 100 that includes one or more of the digital circuit elements 108. In the illustrated example, the target circuit 102 includes digital circuit elements 108a-108i. By defining the target circuit 102 as less than the entire hardware device 100, power analysis tests can be performed more quickly, and can produce less data that needs to be analyzed. Furthermore, the data may be more easily interpreted when the target circuit 102 is more narrowly defined. In contrast, by defining the target circuit 102 more broadly (i.e., as containing more digital circuit elements 108), the power analysis may yield a more accurate peak power dissipation of the hardware device 100.

The target circuit 102 includes input nodes 104 where signals can feed into the target circuit 102 and output nodes 106 where signals are fed out of the target circuit 102. The input nodes 104 can be considered as the bus or buses that carry signals into the target circuit 102 that affect the digital circuit elements 108 within the target circuit 102, and the output nodes 106 can be considered as the bus or busses that carry signals out of the target circuit 102 that are dependent on and/or generated by the digital circuit elements 108 within the target circuit. The output nodes 106 can carry signals that affect digital circuit elements 108 outside of the target circuit 102. As shown in the illustrated example, one or more of the output nodes 106 can be considered as one or more intermediate busses that are not directly connected to digital circuit elements outside of the target circuit 102, such as the output of the digital circuit element 108b.

Figure 2:
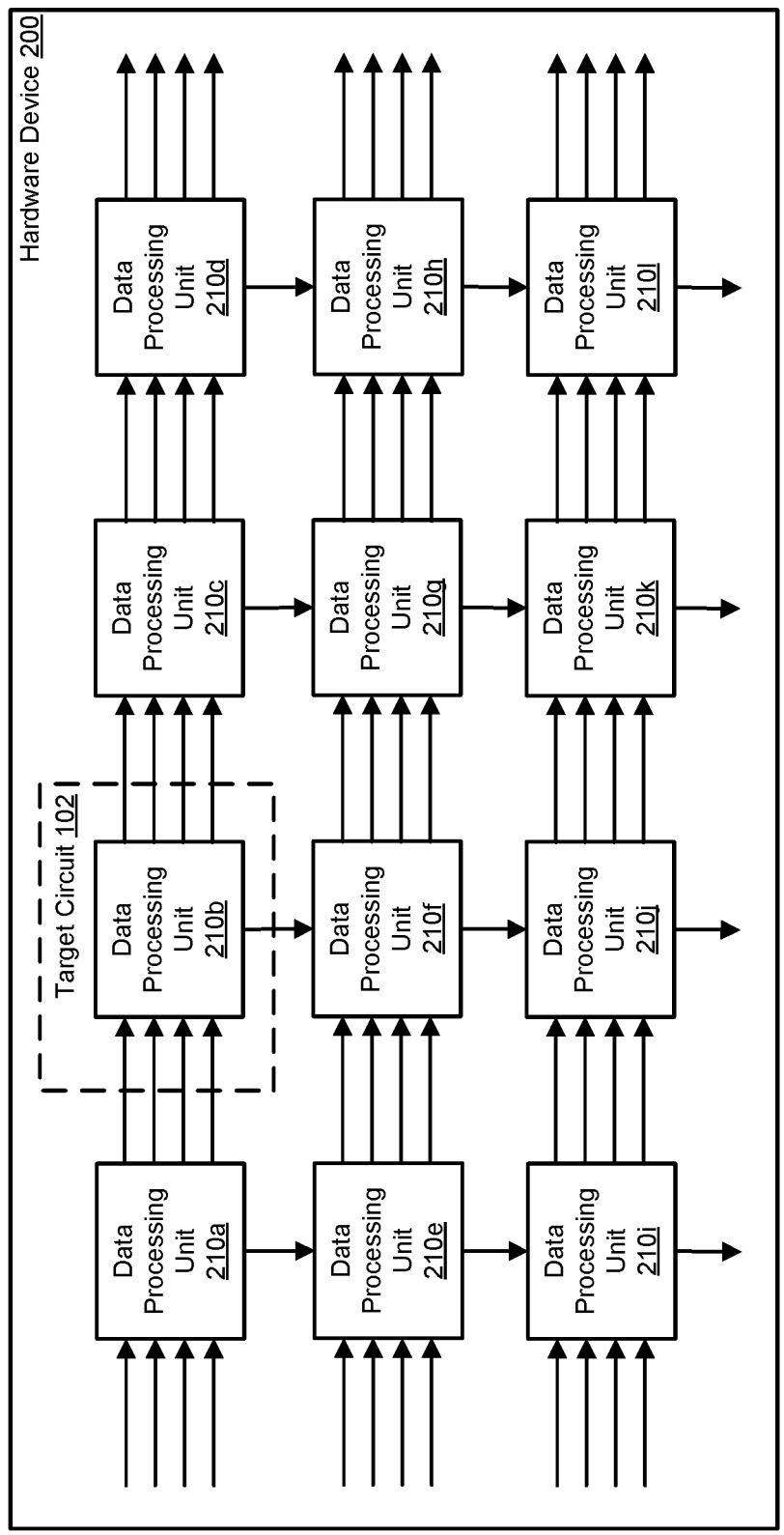
FIG. 2 illustrates an example hardware device having multiple data processing units.

FIG. 2 illustrates an example hardware device 200 having multiple data processing units 210. Each of the data processing units 210 may include a similar set of digital circuit elements 108 arranged in a similar manner to the other data processing units 210. Such architectures are commonly found in parallel computer architectures, such as systolic arrays. The target circuit 102 can be defined within the hardware device 200 as including one of the data processing units 210. The peak power dissipation of the target circuit 102 can be indicative of the peak power dissipation of the hardware device 200 by, for example, scaling by the number of repeated structures.

Figure 3:
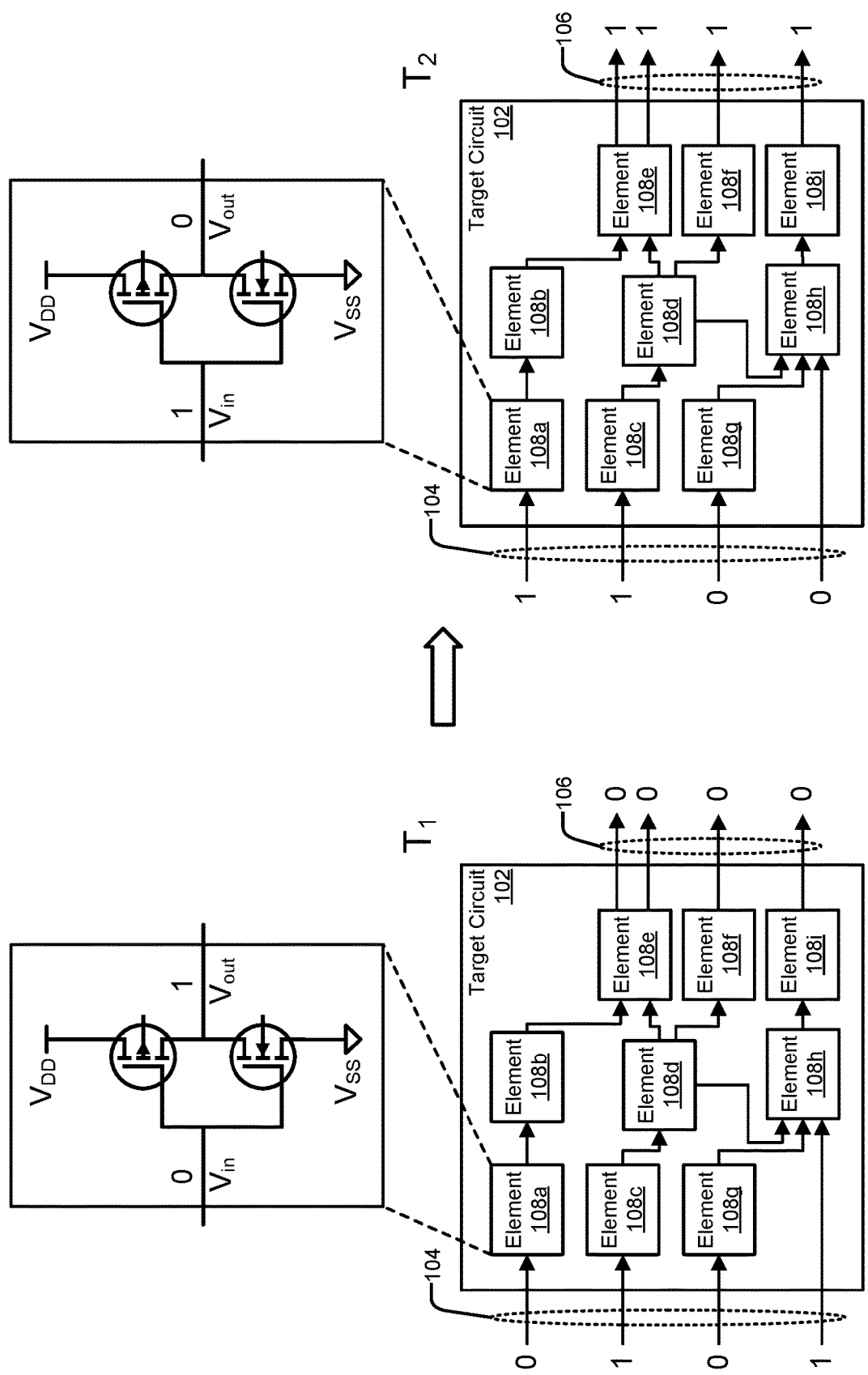
FIG. 3 illustrates an example of different output values that output nodes can have when provided with different input values at input nodes.

FIG. 3 illustrates an example of different output values the output nodes 106 can have when provided with different input values at the input nodes 104. As illustrated by the inset diagrams, a digital circuit element 108 can include various circuit elements, such as transistors and/or other circuit components. At time $T_1$, the input values of [0101] are applied to the input nodes 104, and in response to applying the input values, the output nodes 106 are switched to the output values of [0000]. At time $T_2$, the input values of [1100] are applied to the input nodes 104, and in response to applying the new input values, the output nodes 106 are switched to the output values of [1111]. Accordingly, applying the input values of [0101] followed by [1100] to the input nodes 104 causes the value at each output node to toggle from 0 to 1.

In some examples, multiple sets of input values can be applied to the input nodes 104. Collectively, the multiple sets of input values can be referred to as an input pattern, although an input pattern can also include a single set of input values. For example, an input pattern can include a set of input values at a first time, a different set of input values at a second time, and a different set of input values at a third time. An input pattern is applied to the input nodes 104 by sequentially applying, one at a time, the sets of input values to the input nodes 104.

Figure 4A:
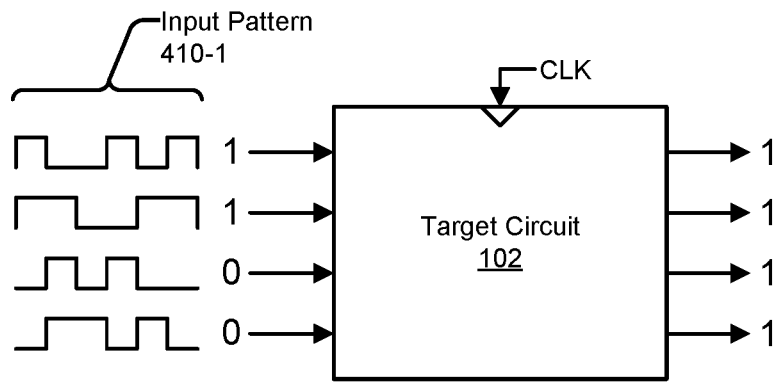
FIGS. 4A-4C illustrate examples of different input patterns that, when applied to input nodes of a target circuit, cause output nodes to switch to a set of output values having a maximum number of values equal to a particular binary value.
Figure 4B:
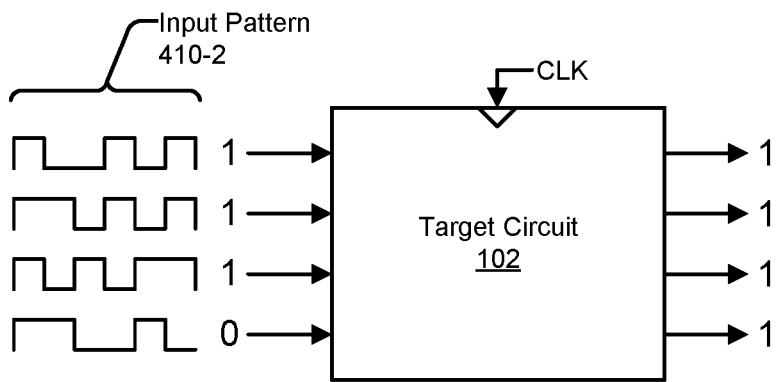
Figure 4C:
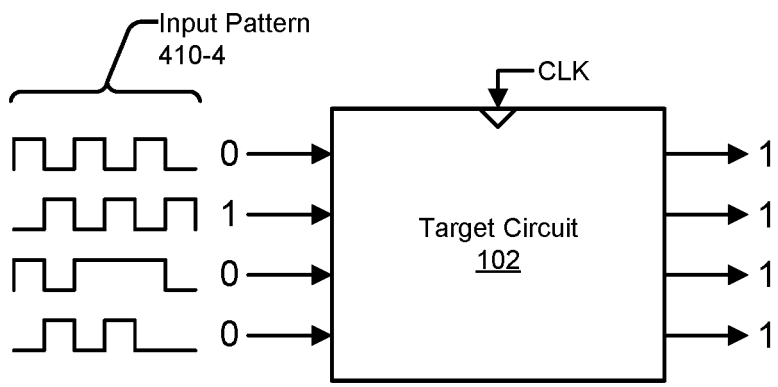

FIGS. 4A-4C illustrate examples of different input patterns that, when applied to the input nodes of the target circuit 102, cause the output nodes to have a maximum number of nodes switch to a particular binary value (in these examples, the particular binary value is 1). In the illustrated examples, the maximum number of nodes that are switched to the particular binary value is 4, which, in these examples, is also equal to the number of output nodes. In some instances, the maximum number of nodes that are switched to the particular binary value can be less than the number of output nodes.

In reference to FIG. 4A, the input pattern 410-1 comprises 6 sets of input values starting with [1100], followed by [0111], [0001], [1010], [0101], and the last of which being [1100]. By sequentially applying the input pattern 410-1 to the input nodes, the output nodes are switched to the set of output values of [1111]. In reference to FIG. 4B, the input pattern 410-2 comprises 6 sets of input values, the last of which being [1110]. By sequentially applying the input pattern 410-2 to the input nodes, the output nodes are switched to the set of output values of [1111]. In reference to FIG. 4C, the input pattern 410-3 comprises 6 sets of input values, the last of which being [0100]. By sequentially applying the input pattern 410-3 to the input nodes, the output nodes are switched to the set of output values of [1111].

Figure 5A:
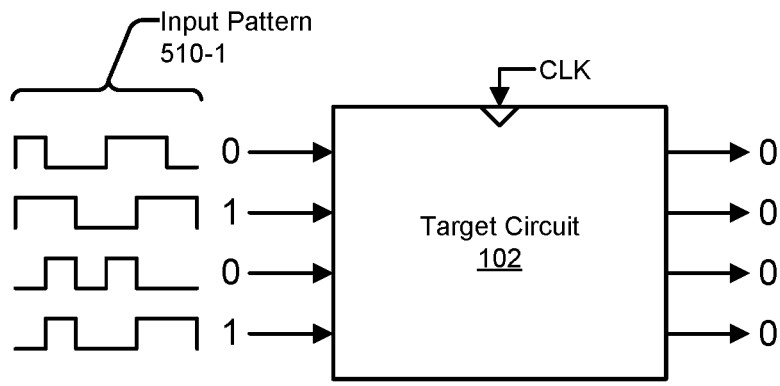
FIGS. 5A-5C illustrate examples of different input patterns that, when applied to input nodes of a target circuit, cause output nodes to switch to a set of output values having a minimum number of values equal to a particular binary value.
Figure 5B:
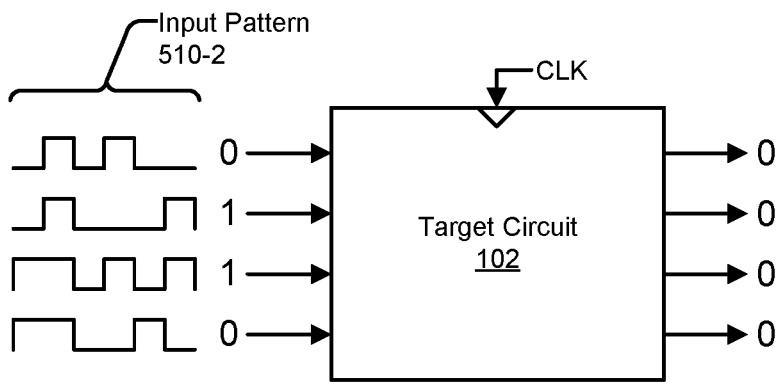
Figure 5C:
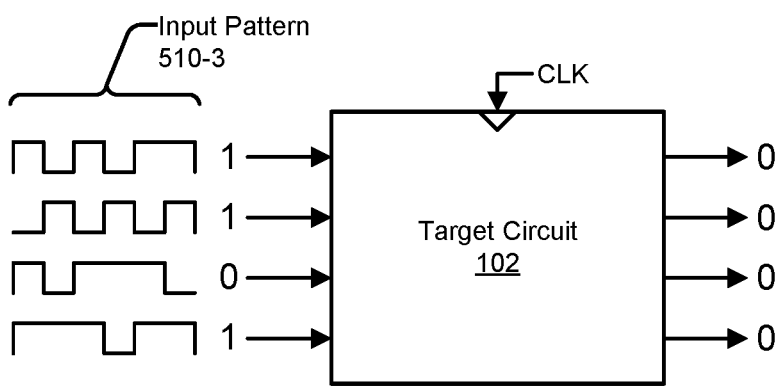

FIGS. 5A-5C illustrate examples of different input patterns that, when applied to the input nodes of the target circuit 102, cause the output nodes to have a minimum number of output nodes switched to a particular binary value (in these examples, the particular binary value is 1). In the illustrated examples, the minimum number of output nodes that are switched to the particular binary value is 0, which is the lowest possible minimum number.

In reference to FIG. 5A, the input pattern 510-1 comprises 6 sets of input values, the last of which being [0101]. By sequentially applying the input pattern 510-1 to the input nodes, the output nodes are switched to the set of output values of [0000]. In reference to FIG. 5B, the input pattern 510-2 comprises 6 sets of input values, the last of which being [0110]. By sequentially applying the input pattern 510-2 to the input nodes, the output nodes are switched to the set of output values of [0000]. In reference to FIG. 5C, the input pattern 510-3 comprises 6 sets of input values, the last of which being [1101]. By sequentially applying the input pattern 510-3 to the input nodes, the output nodes are switched to the set of output values of [0000].

Figure 6:
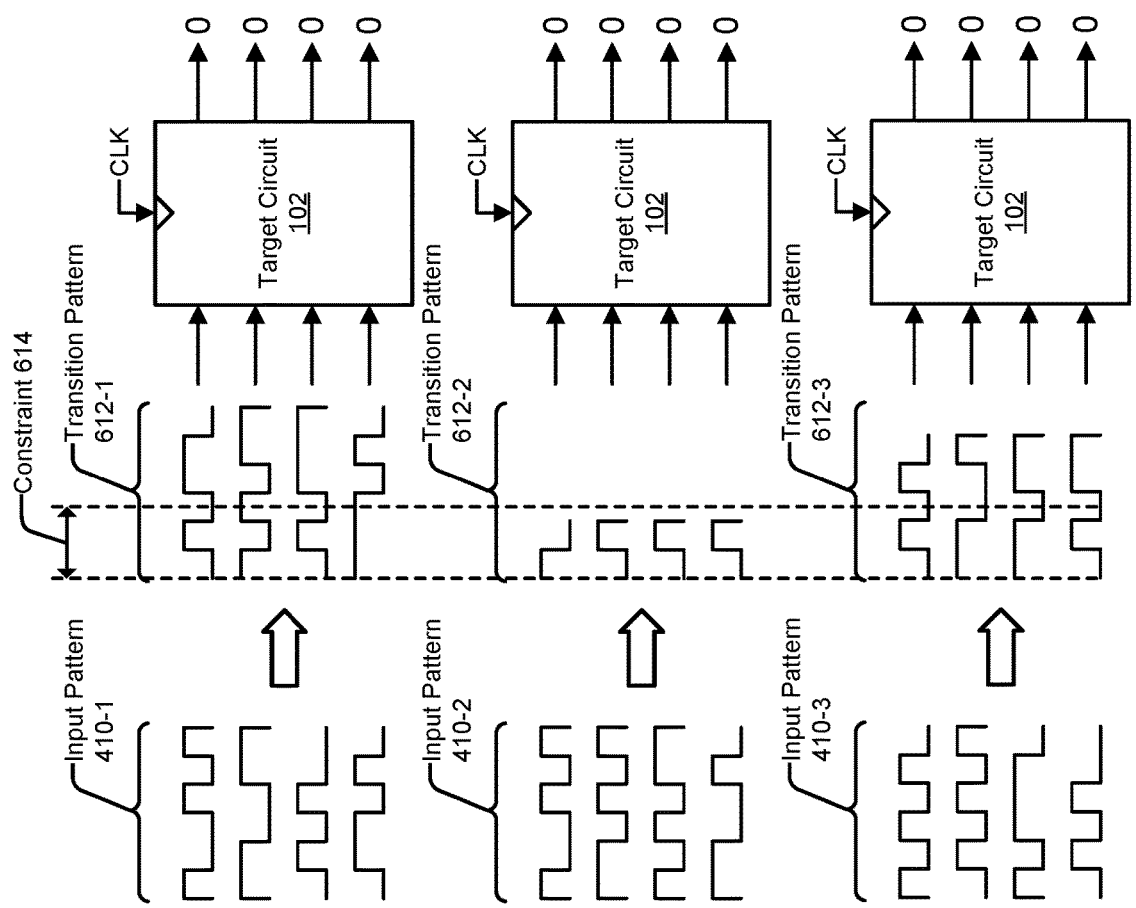
FIG. 6 illustrates examples of different transition patterns that, when applied to input nodes of a target circuit, cause output nodes to switch from values having a maximum number of a particular binary value to values having a minimum number of the particular binary value.

FIG. 6 illustrates examples of different transition patterns 612 that, when applied to the input nodes of the target circuit 102, cause the output nodes to switch from values having the maximum number of the particular binary value to values having the minimum number of the particular binary value. FIG. 6 further illustrates a comparison of the transition patterns to a constraint 614 (e.g., a timing constraint of a particular duration).

The transition pattern 612-1 may be applied to the input nodes after the input pattern 410-1 has been applied to the input nodes, causing the output nodes to switch from values of [1111] to [0000]. The transition pattern 612-1 comprises 6 sets of input values, which exceeds the constraint 614. The transition pattern 612-2 may be applied to the input nodes after the input pattern 410-2 has been applied to the input nodes, causing the output nodes to switch from values of [1111] to [0000]. The transition pattern 612-2 comprises 2 sets of input values, which is within the constraint 614. The transition pattern 612-3 may be applied to the input nodes after the input pattern 410-3 has been applied to the input nodes, causing the output nodes to switch from values of [1111] to [0000]. The transition pattern 612-3 comprises 5 sets of input values, which exceeds the constraint 614. Accordingly, the transition pattern 612-2 may be designated as a power virus pattern.

Figure 7:
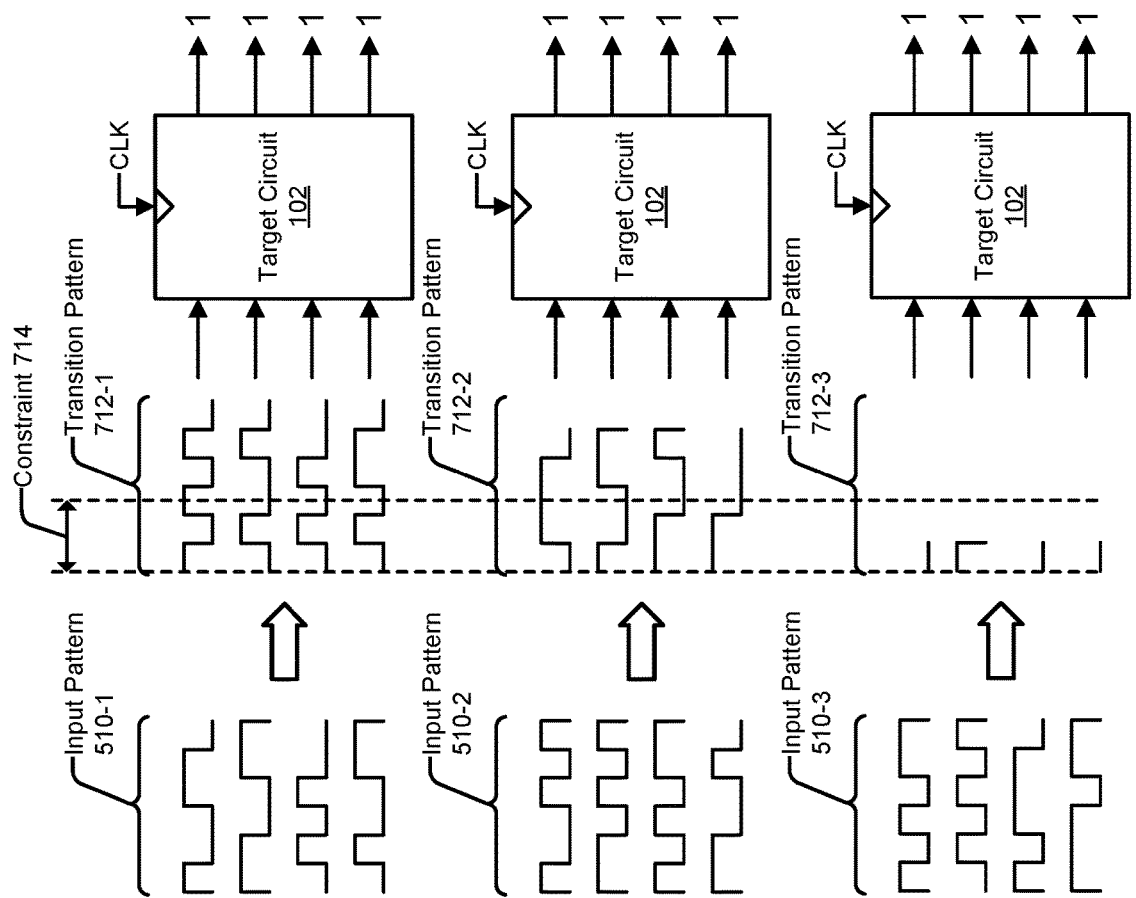
FIG. 7 illustrates examples of different transition patterns that, when applied to input nodes of a target circuit, cause output nodes to switch from values having a minimum number of a particular binary value to values having a maximum number of the particular binary value.

FIG. 7 illustrates examples of different transition patterns 712 that, when applied to the input nodes of the target circuit 102, cause the output nodes to switch from values having the minimum number of the particular binary value to values having the maximum number of the particular binary value. FIG. 7 further illustrates a comparison of the transition patterns 712 to a constraint 714.

The transition pattern 712-1 may be applied to the input nodes after the input pattern 510-1 has been applied to the input nodes, causing the output nodes to switch from values of [0000] to [1111]. The transition pattern 712-1 comprises 6 sets of input values, which exceeds the constraint 714. The transition pattern 712-2 may be applied to the input nodes after the input pattern 510-2 has been applied to the input nodes, causing the output nodes to switch from values of [0000] to [1111]. The transition pattern 712-2 comprises 5 sets of input values, which exceeds the constraint 714. The transition pattern 712-3 may be applied to the input nodes after the input pattern 510-3 has been applied to the input nodes, causing the output nodes to switch from values of [0000] to [1111]. The transition pattern 712-3 comprises 1 set of input values, which is within the constraint 714. Accordingly, the transition pattern 712-3 may be designated as a power virus pattern.

Figure 8:
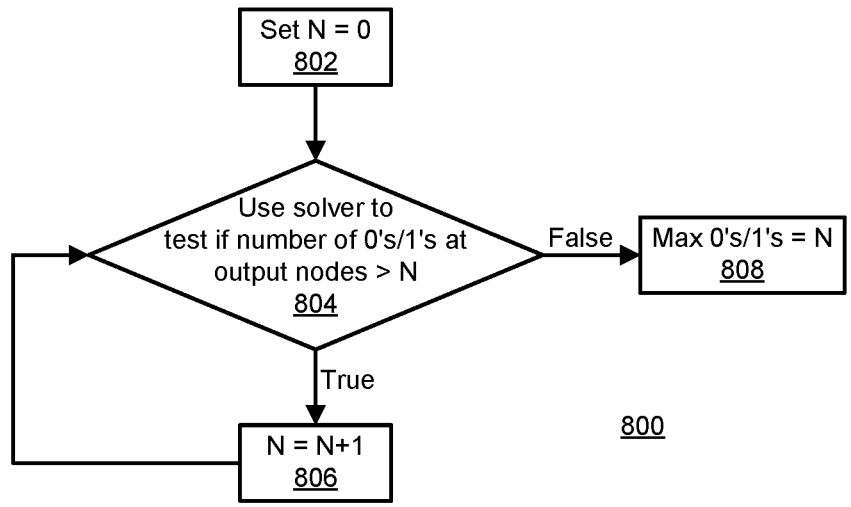
FIG. 8 illustrates an example method for generating an input pattern that produces a maximum number of values equal to a particular binary value at output nodes.

FIG. 8 illustrates an example method 800 for generating an input pattern that switches a maximum number of output nodes to a particular binary value (0 or 1). In some examples, the method 800 uses a Boolean satisfiability problem (SAT) solver that receives as input a Boolean formula and outputs either true or false as to whether there exists a set of conditions in which the Boolean formula can be true. In some examples, the SAT solver can receive as input a relationship between the input nodes and the output nodes of the target circuit, and a desired set of output values. In some examples, the SAT solver can receive as input a desired characteristic of the output values, such as the number of 0's or 1's in the output values.

At step 802, a counter N is initialized to 0. At step 804, an SAT solver is used to determine whether an input pattern exists that causes the number of output nodes to switch the particular binary value to be greater than N. If the output of the solver is true (i.e., an input pattern exists), the method 800 proceeds to step 806. If the output of the solver is false (i.e., an input pattern does not exist), the method 800 proceeds to step 808. At step 806, the counter N is incremented by 1 or by some larger integer (e.g., 2, 5, 10, 50, etc.). After performing step 806, the method 800 returns to step 804. At step 808, it is determined that the maximum number of output nodes that can be switched to the particular binary value is N. One or more input patterns are then generated that cause N output nodes to be switched to the particular binary value.

Figure 9:
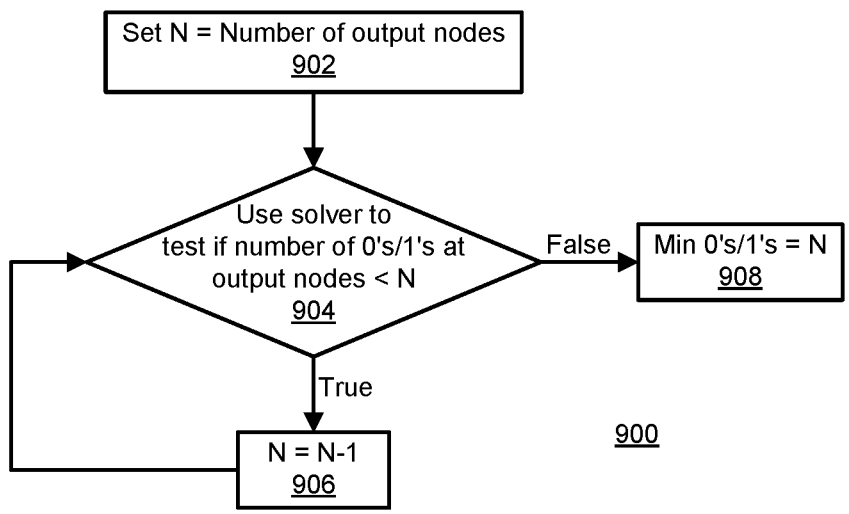
FIG. 9 illustrates an example method for generating an input pattern that produces a minimum number of values equal to a particular binary value at output nodes.

FIG. 9 illustrates an example method 900 for generating an input pattern that switches a minimum number of output nodes to a particular binary value (0 or 1). The method 900 can use an SAT solver similar to that described in reference to the method 800.

At step 902, a counter N is initialized to the number of output nodes. At step 904, an SAT solver is used to determine whether an input pattern exists that causes the number of output nodes to switch to the particular binary value to be less than N. If the output of the solver is true (i.e., an input pattern exists), the method 900 proceeds to step 906. If the output of the solver is false (i.e., an input pattern does not exist), the method proceeds to step 908. At step 906, the counter N is decremented by 1 or by some larger integer (e.g., 2, 5, 10, 50, etc.). After performing step 906, the method 900 returns to step 904. At step 908, it is determined that the minimum number of output nodes that can be switched to the particular binary value is N. One or more input patterns are then generated that cause N output nodes to be switched to the particular binary value.

Figure 10:
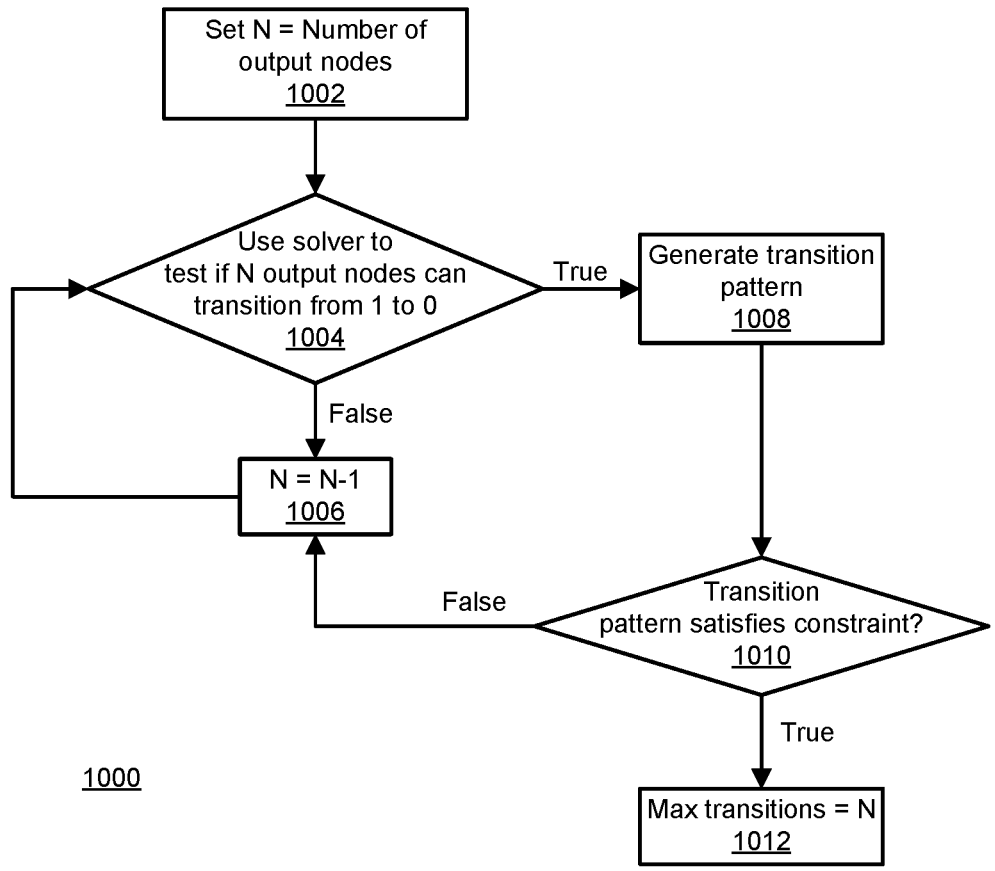
FIG. 10 illustrates an example method for finding a maximum number of output nodes that can transition from a first binary value to a second binary value.

FIG. 10 illustrates an example method 1000 for finding a maximum number of output nodes that can transition from a first binary value (e.g., 1) to a second binary value (e.g., 0). In some examples, the method 1000 uses a solver similar to that described in reference to the method 800.

At step 1002, a counter N is initialized to the number of output nodes. At step 1004, the SAT solver is used to determine whether N output nodes can transition from the first binary value to the second binary value. In some examples, the solver determines whether a transition pattern exists that, when applied to the input nodes, causes N output nodes to transition from the first binary value to the second binary value. If the output of the solver is false (i.e., a transition pattern does not exist), the method 1000 proceeds to step 1006. If the output of the solver is true (i.e., an input pattern exists), the method 1000 proceeds to step 1008. At step 1006, the counter N is decremented by 1 or by some larger integer (e.g., 2, 5, 10, 50, etc.). After performing step 1006, the method 1000 returns to step 1004.

At step 1010, it is determined whether the transition pattern satisfies a constraint. If it is determined that the transition pattern satisfies the constraint, the method proceeds to step 1012. If it is determined that the transition pattern does not satisfy the constraint, the method proceeds to step 1006. At step 1012, it is determined that the maximum number of output nodes that can transition from the first binary value to the second binary value is N.

FIG. 11 illustrates an example method 1100 for power analysis of a hardware device design. The method 1100 may be performed by a computing device. One or more steps of the method 1100 may be performed in an order different than that shown in the illustrated example, and one or more steps of the method 1100 may be omitted during performance of the method 1100.

At step 1102, a target circuit (e.g., the target circuit 102) is defined within the hardware device design (e.g., the hardware device 100). The target circuit may include a plurality of digital circuit elements (e.g., the digital circuit elements 108) linking a plurality of input nodes (e.g., the input nodes 104) with a plurality of output nodes (e.g., the output nodes 106).

At step 1104, a first input pattern (e.g., the input patterns 410) is generated such that, when the first input pattern is applied to the plurality of input nodes, the plurality of output nodes are caused to switch to a first set of output values having a maximum number of values equal to a particular binary value. In some examples, multiple first input patterns can be generated that achieve output values having the maximum number of values equal to the particular binary value. The sets of output values achieved using the different first input patterns can have the same arrangement of 0's and 1's or can have 0's and 1's at different output nodes as compared to the other sets of output values.

At step 1106, a second input pattern is generated such that, when the second input pattern is applied to the plurality of input nodes, the plurality of output nodes are caused to switch to a second set of output values having a minimum number of values equal to the particular binary value. In some examples, multiple second input patterns can be generated that achieve output values having the minimum number of values equal to the particular binary value. The sets of output values achieved using the different second input patterns can have the same arrangement of 0's and 1's or can have 0's and 1's at different output nodes as compared to the other sets of output values.

At step 1108, a transition pattern is generated that links the first set of output values to the second set of output values. In some examples, the transition pattern causes, when applied to the plurality of input nodes after the first input pattern has been applied, the plurality of output nodes to switch from the first set of output values to the second set of output values. In some examples, the transition pattern causes, when applied to the plurality of input nodes after the second input pattern has been applied, the plurality of output nodes to switch from the second set of output values to the first set of output values. In some embodiments, multiple transition patterns can be generated. For example, a first transition pattern can be generated that switches the first set of output values to the second set of output values, and a second transition pattern can be generated that switches the second set of output values to the first set of values. Additionally, a third transition pattern that is different than the first transition pattern can be generated that switches the first set of output values to the second set of output values.

At step 1110, it is determined whether the transition pattern satisfies a constraint (e.g., a timing constraint). In some examples, step 1110 includes determining whether the length or duration of any generated transition pattern is less than the timing constraint. If the transition pattern satisfies the constraint, then the transition pattern can be designated as a power virus pattern. In some examples, the power virus pattern may be a combination of the first input pattern and the transition pattern, or the combination of the second input pattern and the transition pattern. In some examples, the power virus pattern may correspond to the first input pattern on some cycles (e.g., even cycles) and correspond to the second input pattern on other cycles (e.g., odd cycles).

In some examples, if none of the generated transition patterns satisfies the constraint, the method 1100 returns to step 1104 and a new input pattern is generated for the first input pattern and/or the second input pattern. For example, when step 1104 is repeated, a new first input pattern can be generated that, when applied to the plurality of input nodes, causes the plurality of output nodes to switch to a new first set of output values having fewer values equal to the particular binary value then the maximum number of values (e.g., the next highest number of values). When step 1106 is repeated, a new second input pattern can be generated that, when applied to the plurality of input nodes, causes the plurality of output nodes to switch to a new second set of output values having more values equal to the particular binary value than the minimum number of values (e.g., the next lowest number of values).

At step 1112, a power dissipation associated with the transition pattern is calculated. In some implementations, step 1112 may only calculate the power dissipation if the transition pattern satisfies than the constraint (e.g., having a length or duration less than the timing constraint). In some examples, step 1112 includes calculating the power dissipation associated with the combination of the first input pattern and the transition pattern, or the combination of the second input pattern and the transition pattern.

FIG. 12 illustrates an example method 1200 for power analysis of a hardware device design. The method 1200 may be performed by a computing device. One or more steps of the method 1200 may be performed in an order different than that shown in the illustrated example, and one or more steps of the method 1200 may be omitted during performance of the method 1200.

At step 1202, a target circuit (e.g., the target circuit 102) is defined within the hardware device design (e.g., the hardware device 100). The target circuit may include a plurality of digital circuit elements (e.g., the digital circuit elements 108) linking a plurality of input nodes (e.g., the input nodes 104) with a plurality of output nodes (e.g., the output nodes 106).

At step 1204, a counter is set equal to a start value. In some examples, the start value is the number of the plurality of output nodes. In some examples, the start value is some value less than the number of the plurality of output nodes.

At step 1206, it is determined, using a solver, whether a first transition pattern exists that, when applied to the plurality of input nodes, causes a first number of output nodes equal to the counter to transition from a first binary value to a second binary value. For example, if the counter is equal to 100, it may be determined whether 100 output nodes can transition from 1 to 0. In some examples, it is determined that the first transition pattern does not exist.

At step 1208, in response to determining that the first transition pattern does not exist, the counter is decremented by a decrement amount. In some examples, the decrement amount is equal to 1. For example, the counter may be decremented from 100 to 99.

At step 1210, it is determined, using the solver, whether a second transition pattern exists that, when applied to the plurality of input nodes, causes a second number of output nodes equal to the decremented counter to transition from the first binary value to the second binary value. For example, if the decremented counter is equal to 99, it may be determined whether 99 output nodes can transition from 1 to 0. In some examples, it is determined that the second transition pattern exists.

At step 1212, in response to determining that the second transition pattern exists, the second transition pattern may be generated. In some examples, the second transition pattern may be generated using the solver. In some examples, a second input pattern may be generated that, when applied to the plurality of input nodes prior to the second transition pattern, causes the plurality of output nodes to have at least a second number of values equal to the first binary value, the second number of values being equal to the decremented counter. For example, if the decremented counter is equal to 99, the second input pattern, when applied to the plurality of input nodes prior to the second transition pattern, causes at least 99 output nodes to have a value of 1. In some examples, multiple second input patterns may generated that achieve sets of output values having the same arrangement of 0's and 1's or having 0's and 1's at different output nodes.

At step 1214, it is determined whether the second transition satisfies a constraint (e.g., a timing constraint). In some examples, step 1210 includes determining whether the duration of the second transition pattern is less than or equal to the timing constraint (a single cycle, 2 cycles, 10 cycles, etc.). If the second transition pattern satisfies the constraint, then the transition pattern can be designated as a power virus pattern. In some examples, the power virus pattern may be a combination of the second input pattern and the second transition pattern. In some examples, the constraint may be that certain combinations of 0's and 1's in the transition patterns are invalid as it is not possible for such combinations to occur. In some examples, the constraint may be a constraint with respect to the input pattern that is applied to the input nodes prior to the transition pattern. For example, the constraint may be that certain combinations of 0's and 1's in the input pattern are invalid as it is not possible for such combinations to occur.

In some examples, if the second transition pattern does not satisfy the constraint, the counter is decremented again and it is determined, using the solver, whether a third transition pattern exists that, when applied to the plurality of input nodes, causes a third number of output nodes equal to the decremented counter to transition from the first binary value to the second binary value. For example, if the decremented counter is equal to 98, it may be determined whether 98 output nodes can transition from 1 to 0. These steps are repeated until a transition pattern is found that satisfies the constraint, thereby finding the maximum number of transitions that are possible.

In some examples, if the counter is decremented all the way to 0 without finding a transition pattern that satisfies the constraint, the constraint may be relaxed (e.g., increasing a maximum time duration) and the above-described steps may be repeated using the relaxed constraint. If the counter is decremented all the way to 0 a second time without finding a transition pattern that satisfies the relaxed constraint, the relaxed constraint may be relaxed a second time and the steps may be repeated.

At step 1216, if the second transition pattern satisfies the constraint, a power dissipation associated with the second transition pattern is calculated. In some examples, step 1216 includes calculating the power dissipation associated with the combination of the second input pattern and the second transition pattern.

Figure 13:
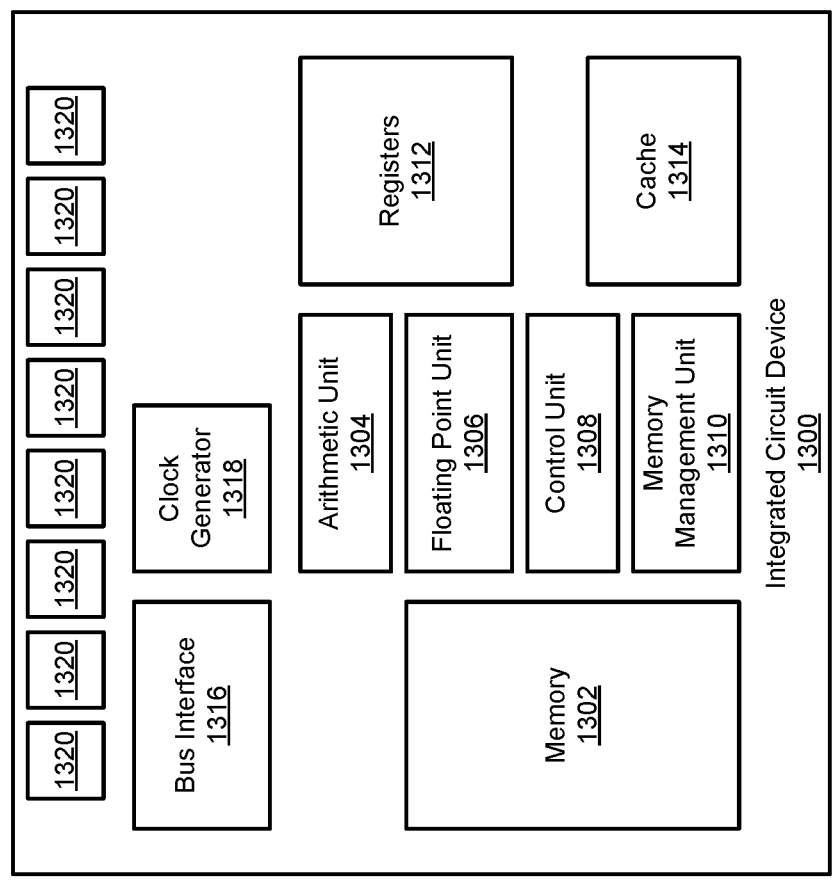
FIG. 13 includes a block diagram of an example integrated circuit device.

FIG. 13 includes a block diagram of an example integrated circuit device 1300, as an example of a hardware device on which the power analysis techniques discussed above can be applied. In various examples, the integrated circuit device 1300 is a semiconductor-based device that includes multiple layers of substrates forming transistors, capacitors, vias, and other circuit elements. In the example of FIG. 13, the integrated circuit device 1300 is implemented on a single die. In other examples, the integrated circuit device 1300 can be implemented using multiple dies.

The example integrated circuit device 1300 includes a memory 1302, an arithmetic unit 1304, a floating point unit 1306, a control unit 1308, a memory management unit 1010, registers 1312, a cache 1314, a bus interface 1316, a clock generator 1318, and multiple I/O pads 1320.

The memory 1302 can include circuits that are able to store values. For example, the memory 1302 can store instructions that are to be executed by the integrated circuit device 1300. The memory 1302 can be implemented using, for example, a variety of Static Random Access Memory (SRAM). In some examples, the memory 1302 may be small, in view of the limited amount of space in the integrated circuit device 1300.

The arithmetic unit 1304 may be configurable to perform arithmetic or logical operations. The arithmetic unit 1304 can be configured, for example, to read operands from one or more of the registers 1312, and to place results in a register.

The floating point unit 1306 can perform floating point arithmetic. The floating point unit 1306 can also be configured to read operations from the registers 1312 and to write results to the registers 1312.

The control unit 1308 can include circuitry for executing instructions and/or for coordinating the activities of the other blocks in the integrated circuit device 1300. For example, the control unit 1308 can configure the registers from which arithmetic unit 1304 is to read operands, as well as the operation the arithmetic unit 1304 is to perform on the operands. The control unit 1308 can further instruct the arithmetic unit 1304 where to place a result of the operation. As a further example, the control unit 1308 can write data into the registers 1312, and read data from the registers 1312, possibly to move the data to the memory 1302 and/or elsewhere.

The memory management unit 1310 can managed the memory 1302, the cache 1314, and possibly also the registers 1312. The memory management unit 1310 can, for example, cause data to be moved from the memory 1302 to the cache 1314, or vice versa. As a further example, the memory management unit 1310 can cause data to be moved from the cache 1314 to an external memory, or vice versa. In various examples, the operations the memory management unit 1310 perform are controlled by the control unit 1308. For example, when the control unit 1308 determines that the integrated circuit device 1300 is ready for new instructions to be loaded into the memory 1302, the control unit 1308 can instruct the memory management unit 1310 to obtain the instructions from an external memory.

The registers 1312 can provide temporary storage for values being operated on by the integrated circuit device 1300. Compared to the memory 1302, each register is quite small, storing, for example, one data word each (where a data word can be 16, 32, 64, or another number of bits long). Each register is also directly accessible, such that the number of registers may be limited by the wiring required for each to be independently readable and writeable. Because the registers 1312 are directly accessible and can be read or written faster than the memory 1302, it may be preferable for values being operated on by, for example, the arithmetic unit 1304 or the point unit 1306 to be in the registers 1312, rather than in the memory 1302.

The cache 1314 is a memory where data that was recently used by the integrated circuit device 1300, and/or that may soon need to be used, can be stored. The data can, for example, have been in the memory 1302, was operated on by the control unit 1308, and then was moved to the cache 1314 to make space in the memory 1302 for new data. As another example, the integrated circuit device 1300 may have needed a particular data word, which the memory management unit 1310 may have loaded into the cache 1314 along with a set of data words (e.g., a cache line), under the assumption that the integrated circuit device 1300 may need a data word that was stored in external memory next to the particular data word. The cache 1314 can thus save time by reducing how frequently the integrated circuit device 1300 needs to access external memory. Determining when data needs to be loaded into the cache from an external memory, and/or when data needs to be moved out of the cache, can be handled by the memory management unit 1310.

The bus interface 1316 can include circuitry that enables the integrated circuit device 1300 to communicate with other devices, such as external memories. The bus interface 1316 can implement various protocols, such as Advanced eXtensible Interface (AXI), Advanced High-performance Bus (AHB), Peripheral Component Interconnect (PCI), or another bus protocol. The bus interface 1316 can be connected to the I/O pads 1320 to enable the bus interface 1316 to communicate with external devices. In various examples, the integrated circuit device 1300 can include multiple bus interfaces, which may implement different protocols.

The clock generator 1318 can generate one or more clock signals for the integrated circuit device 1300, which may have different frequencies. In some examples, the clock generator 1318 operates off of a clock input to the integrated circuit device 1300 (received at one of the I/O pads 1320), which the clock generator 1318 can use to generate clock signals of different frequencies.

The I/O pads 1320 can include circuitry for connecting the integrated circuit device 1300 to the physical pins or balls of the package that encloses the integrated circuit device 1300. The pins or balls (e.g., drops of conductive material) can connect the integrated circuit device 1300 to a printed circuit board. Some of the I/O pads 1320 can be for inputting signals into the integrated circuit device 1300, others can be for outputting signals from the integrated circuit device 1300, and/or others can be bi-directional. In most cases, the I/O pads 1320 are present along most of the edges of the integrated circuit device 1300, but only a few are illustrated here, for the sake of clarity.

These blocks illustrated in FIG. 13 provide examples of blocks that a can be found in an integrated circuit device, and are intended only to be illustrative. In other examples, an integrated circuit device can include components that are not illustrated here, can include multiple instances of a component, and/or can lack some of the components that are included in this illustration. The arrangement and spacing of the blocks is also not intended to be representative of the arrangement and spacing that may be found in an actual device. The arrangement and spacing have been selected only for the convenience of the illustration.

FIG. 14 includes a block diagram that illustrates an example of a host system 1470 in which the integrated circuit device of FIG. 13 can be used. In some examples, the host system 1470 of FIG. 14 can be used to implement a general purpose computer, such as a desktop computer, a laptop computer, a server computer, a thin client, and so on. In some examples, the host system 1470 can be used to implement mobile computing devices, such as a mobile phone, a smart phone, a personal digital assistant (PDA), or a tablet computer, among other examples. In some examples, the host system 1470 can be used to implement somewhat more special purpose devices, such as home assistants, gaming consoles, electronic books (e-books), media centers, and so on. In some examples, the host system 1470 can be used to implement computing devices incorporated into appliances, automobiles and other vehicles, robots, and other electronic devices.

The example host system 1470 of FIG. 14 includes a host processor 1472, processor memory 1476, Input/Output (I/O) devices 1478, network interfaces 1482, and various support systems 1474. In various implementations, the host system 1470 can include other hardware that is not illustrated here.

The host processor 1472 is a general purpose integrated circuit that is capable of executing program instructions. In some examples, the host processor 1472 can include multiple processing cores. In a multi-core processor, each core may be able to independently execute program code. In some examples, the cores may share resources, such as buses and caches. In some examples, the host processor 1472, whether single core or multi-core, may be a multi-threaded processor, in which case the host processor 1472 can execute multiple threads of execution (e.g., independent sets of program code) at the same time. In some examples, the host system 1470 can include more than one host processor 1472.

The memory 1476 can include memory that is used by the host processor 1472 for storage of program code that the host processor 1472 is in the process of executing, as well as for storage of values that are being operated on by the host processor 1472. For example, the memory 1476 can be storing an operating system 1490, one or more applications 1492, one or more device drivers 1494, and data 1496 associated with the operating system 1490, the applications 1492, and/or the drivers 1494. In various examples, memory 1476 can be implemented using volatile memory types (such as Random Access Memory (RAM) type memories) and/or non-volatile memory types (such as Read-Only Memory (ROM), flash memory, etc.). In some examples, some or all of the memory 1476 may be accessible to the I/O devices 1478. The processor memory 1476 is often referred to as DRAM, though the actual implementation of the memory may not make use of Dynamic Random Access Memory.

The operating system 1490 can coordinate the activities of the hardware of the host system 1470, as well as the activities of the applications 1492 and drivers 1494. For example, the operating system 1490 can perform operations such as scheduling tasks, executing applications, or controlling peripheral devices. In some examples, the operation system 1490 can include a hypervisor which can support the operation of virtual machines on the host system 1470. In some examples, the hypervisor runs as kernel space application. In these and other examples, each virtual machine can execute an independent operating system, and may have different virtual hardware configurations. Examples of operating systems include Unix, Linux, Windows, Mac OS, iOS, Android, and the like. The operating system 1490 may also be a proprietary operating system.

The applications 1492 can enable a user to interact with the host system 1470 and/or with systems on the network 1480. The applications 1492 can include user space applications, such as web browsers, text editors, video or audio players, and so on. Each of the applications 1492 can be embodied as program code, or instructions that, when executed, cause the host processor 1472 to perform operations that implement the applications 1492. In various examples, the code for the applications 1492 can be stored on a non-volatile storage medium, such as a disk drive, and can be copied into the memory 1476 when being executed.

The drivers 1494 can include programs that manage communications between the operating system 1490 and/or applications 1492 and hardware components of the host system 1470, such as the I/O devices 1478 and network interfaces 1482. For example a driver can provide an Application Programming Interface (API) that provides abstract commands for using the functions of an I/O device. In this example, the API may be standardized, and the driver may be able to translate the abstract commands to specific commands for a particular I/O device. Drivers are often kernel space applications, so that user-space code may be prevented from accidentally or intentionally misusing the hardware of the host system 1470.

The data 1496 can include data used and/or operated on by the operating system 1490, applications 1492, and/or drivers 1494. Examples of such data include web pages, video data, audio data, images, user data, and so on. Alternatively or additionally, the data 1496 can include software libraries that maybe used by the operating system 1490, applications 1492, and/or drivers 1494. In some examples, the data 1496 may be accessible to systems on the network 1480.

The I/O devices 1478 can include hardware that adds functionality to the example host system 1470. For example, the I/O devices 1478 can include non-volatile storage devices, such as solid state drives, magnetic drives, optical drives, and/or tape drives, among other examples. The I/O devices 1478 can further include accelerators such as graphics accelerators, and other, more special purpose, devices. As another example, the I/O devices 1478 can include hardware for connecting to external I/O devices 1486, such as keyboards, monitors, printers, and external storage drives among other devices. The network interfaces 1482 are also I/O devices, though are illustrated separately here for the sake of clarity. Herein, some I/O devices may also be referred to as peripheral devices. In various examples, an I/O device can include a processor and memory that are additional to the host processor 1472 and memory 1476 of the host system 1470. The processor of the I/O device may operate independently of the host processor 1472, or maybe used by the host processor 1472 for various purposes. For example, the I/O device can include a Graphics Processing Unit (GPU), which the host processor 1472 can use for large computations. In some examples, the host system 1470 can also be connected to external I/O devices 1486, such as external hard drives.

In some examples, one or more of the I/O devices 1478 can be based on one of the Peripheral Component Interconnect (PCI) standards. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices in a host systm. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the host system 1470 can include a storage device that implements NVMe as the primary communication interface.

A PCI-based device can include one or more functions. A "function" describes operations that may be provided by the device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, a PCI-based device can include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to the operating system 1490 and/or applications 1492 to be multiple devices providing the same functionality. The functions of an SR-IOV-capable device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host system 1470.

The network interfaces 1482 can enable the host system 1470 to communicate with a network 1480 or with multiple networks. The network interfaces 1482 can include, for example, one or more network interface cards (NICs). The network interfaces 1482 can include, for example, physical ports for connecting to a wired network. Alternatively or additionally, the network interfaces 1482 can include antennas for connecting to a wireless network. In some examples, the network interfaces 1482 can include more than one physical port, and/or more than one antenna, so that the host system 1470 can communicate with multiple networks at the same time.

The support systems 1474 can include various hardware that supports the operations of the host processor 1472 and/or the I/O devices 1478. For example, the support systems 1474 can include a boot ROM that stores the code for the Basic Input/Output System (BIOS) of the host system 1470, and that enables the host system 1470 to boot from being powered on. As another example, the various support systems 1474 can include a power supply and power subsystem. Other devices that may be found in the support systems 1474 can include a Board Management Controller (BMC) and/or various other volatile or non-volatile memories.

The host system 1470 can further include one or more busses 1484, which may also referred to as interconnects. The busses 1484 can enable the various components of the example host system 1470 to communicate with one another. For example, the busses 1484 can include a bus that is dedicated to communications between the host processor 1472 and the processor memory 1476. As another example, the busses 1484 can include an I/O bus, which enables the host processor 1472 to communicate with the I/O devices 1478, and which may enable the I/O devices 1478 to communicate among each other. In some examples, the I/O bus is a PCI-based bus or bus network. The busses 1484 can include other busses, such as a power management bus, sideband busses, control busses, and/or dedicated busses between certain components (e.g., a BMC and the host processor 1472).

The memory 1476, storage devices, and other memories discussed above are each examples of computer-readable medium. Other examples of computer-readable medium include removable storage devices, such as magnetic tapes, floppy disks, Compact Discs (CDs), Digital Versatile Discs (DVDs), Blue-Ray disks, and flash memory drives, among other examples. In each of these examples the compute-readable medium is capable of storing program code that can be executed by the host processor 1472. In some cases, the computer-readable medium may be non-transitory, meaning that the data stored on the computer-readable medium remains stored on the medium when power is not applied to the computer readable medium. In contrast, when power is removed from transitory computer-readable medium, such as RAM, the data is deleted from the medium. Examples of non-transitory computer-readable medium include ROM-based memory, hard disks, removable disks such as those listed above, and flash-based memory, among other examples.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples are described herein, including the best mode known to the inventors for carrying out the examples. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method for power analysis of a hardware device design, the method comprising:
   selecting, by a computing device, a target circuit within the hardware device design, the target circuit including digital circuit elements linking a plurality of input nodes with a plurality of output nodes;
   setting, by the computing device, a counter equal to a number of the plurality of output nodes;
   determining, by the computing device and using a solver, whether a first transition pattern exists that, when applied to the plurality of input nodes, causes a first number of output nodes equal to the counter to transition from 0 to 1;
   in response to determining that the first transition pattern does not exist, decrementing the counter by 1;
   determining, by the computing device and using the solver, whether a second transition pattern exists that, when applied to the plurality of input nodes, causes a second number of output nodes equal to the decremented counter to transition from 0 to 1;
   in response to determining that the second transition pattern exists, generating, by the computing device and using the solver, the second transition pattern;
   determining, by the computing device, whether the second transition pattern satisfies a constraint; and
   in response to determining that the second transition pattern satisfies the constraint, calculating, by the computing device, a power dissipation associated with the second transition pattern.

2. The method of claim 1, wherein the constraint is a timing constraint, and wherein determining whether the second transition pattern satisfies the constraint includes determining whether a duration of the second transition pattern is less than or equal to the timing constraint.

3. The method of claim 1, further comprising:
   generating, by the computing device and using the solver, a first input pattern that, when applied to the plurality of input nodes prior to the first transition pattern, causes the plurality of output nodes to have at least a first number of values equal to 0, wherein the first number of values is equal to the counter.

4. The method of claim 1, further comprising:
   generating, by the computing device and using the solver, a second input pattern that, when applied to the plurality of input nodes prior to the second transition pattern, causes the plurality of output nodes to have at least a second number of values equal to 0, wherein the second number of values is equal to the decremented counter.

5. A method implemented by a computing device, the method comprising:
  defining a target circuit within a hardware device design, the target circuit including digital circuit elements linking a plurality of input nodes with a plurality of output nodes;
  setting a counter equal to a start value;
  determining, using a solver, that a first transition pattern does not exist that, when applied to the plurality of input nodes, causes a first number of output nodes equal to the counter to transition from a first binary value to a second binary value;
  decrementing the counter by a decrement amount;
  determining, using the solver, that a second transition pattern exists that, when applied to the plurality of input nodes, causes a second number of output nodes equal to the decremented counter to transition from the first binary value to the second binary value; and
  generating, using the solver, the second transition pattern.

6. The method of claim 5, further comprising:
  determining that the second transition pattern satisfies a constraint.

7. The method of claim 5, wherein:
  the first binary value is a 0 and the second binary value is a 1; or
  the first binary value is a 1 and the second binary value is a 0.

8. The method of claim 5, wherein the decrement amount is equal to 1.

9. The method of claim 5, further comprising:
  calculating a power dissipation associated with the second transition pattern.

10. The method of claim 5, further comprising:
  determining that the second transition pattern does not satisfy a constraint;
  decrementing the counter by the decrement amount; and
  determining, using the solver, that a third transition pattern exists that, when applied to the plurality of input nodes, causes a third number of output nodes equal to the decremented counter to transition from the first binary value to the second binary value.

11. The method of claim 5, wherein the start value is equal to a number of the plurality of output nodes.

12. The method of claim 6, wherein the constraint is a timing constraint, and wherein determining that the second transition pattern satisfies the constraint includes determining that a duration of the second transition pattern is less than or equal to the timing constraint.

13. The method of claim 12, wherein the timing constraint is a single cycle.

14. A non-transitory computer-readable medium comprising instructions that, when executed by a processor, cause the processor to perform operations comprising:
  defining a target circuit within a hardware device design, the target circuit including digital circuit elements linking a plurality of input nodes with a plurality of output nodes;
  setting a counter equal to a start value;
  determining, using a solver, that a first transition pattern does not exist that, when applied to the plurality of input nodes, causes a first number of output nodes equal to the counter to transition from a first binary value to a second binary value;
  decrementing the counter by a decrement amount;
  determining, using the solver, that a second transition pattern exists that, when applied to the plurality of input nodes, causes a second number of output nodes equal to the decremented counter to transition from the first binary value to the second binary value; and
  generating, using the solver, the second transition pattern.

15. The non-transitory computer-readable medium of claim 14, wherein the operations further comprise:
  determining that the second transition pattern satisfies a constraint.

16. The non-transitory computer-readable medium of claim 14, wherein:
  the first binary value is a 0 and the second binary value is a 1; or
  the first binary value is a 1 and the second binary value is a 0.

17. The non-transitory computer-readable medium of claim 14, wherein the operations further comprise:
  calculating a power dissipation associated with the second transition pattern.

18. The non-transitory computer-readable medium of claim 14, wherein the operations further comprise:
  determining that the second transition pattern does not satisfy a constraint;
  decrementing the counter by the decrement amount; and
  determining, using the solver, that a third transition pattern exists that, when applied to the plurality of input nodes, causes a third number of output nodes equal to the decremented counter to transition from the first binary value to the second binary value.

19. The non-transitory computer-readable medium of claim 15, wherein the constraint is a timing constraint, and wherein determining that the second transition pattern satisfies the constraint includes determining that a duration of the second transition pattern is less than or equal to the timing constraint.

20. The non-transitory computer-readable medium of claim 19, wherein the timing constraint is a single cycle.

* * * * *